(12) United States Patent
Ullein

(10) Patent No.: US 6,482,116 B1
(45) Date of Patent: Nov. 19, 2002

(54) TENSIONING DEVICE FOR CHAINS

(75) Inventor: Thomas Ullein, Kühruhweg (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/577,182

(22) Filed: May 23, 2000

(30) Foreign Application Priority Data

May 26, 1999 (DE) .......................... 199 23 905

(51) Int. Cl.[7] ................................. F16H 7/08
(52) U.S. Cl. .................. 474/111; 474/140; 474/101; 474/109
(58) Field of Search ............... 474/111, 110, 474/119, 122, 101; 123/90.15; 425/376.1; 156/155

(56) References Cited

U.S. PATENT DOCUMENTS

| | | | |
|---|---|---|---|
| 4,419,165 A | * 12/1983 | LaValley | ..................... 156/155 |
| 4,456,450 A | * 6/1984 | Heling | ..................... 425/376.1 |
| 5,197,420 A | * 3/1993 | Arnold et al. | ........... 474/111 X |
| 5,782,625 A | 7/1998 | Young | |
| 5,797,817 A | 8/1998 | Senftleben et al. | |
| 6,093,123 A | * 7/2000 | Baddaria et al. | ........ 474/111 X |
| 6,129,644 A | * 10/2000 | Inoue | ..................... 474/111 X |

FOREIGN PATENT DOCUMENTS

| | | |
|---|---|---|
| DE | 2528199 | 1/1976 |
| DE | 4023728 | 1/1992 |
| DE | 19651091 | 6/1997 |
| EP | 0947731 | 10/1999 |

* cited by examiner

Primary Examiner—David A. Bucci
Assistant Examiner—Marcus Charles
(74) Attorney, Agent, or Firm—Bierman, Muserlian and Lucas

(57) ABSTRACT

A tensioning device for a chain (1) comprising a housing (3), said housing (3) carries a first sliding shoe (6) for contact with a first side (7) of the chain (1) with the tensioning device further comprising a tensioning piston (5,23) that is guided on the housing (3) and comprises a second sliding shoe (8,24) for contact with a second side (9) of the chain (1) whereby in an economic and simple-to-manufacture tensioning device, the housing (3) and the first sliding shoe (6) are made in one piece with each other.

16 Claims, 2 Drawing Sheets

TENSIONING DEVICE FOR CHAINS

FIELD OF THE INVENTION

The present invention concerns tensioning devices, particularly tensioning devices that can be used in the camshaft drive of internal combustion engines.

BACKGROUND OF THE INVENTION

DE 196 51 091 A1, for example, discloses a tensioning device for chains which comprises a housing having a hollow bore in which a hollow piston is mounted for sliding and biased in outward direction against the chain by a spring. On its chain-proximate end, the piston carries a separate sliding shoe that is in contact with the chain. The housing comprises a further sliding shoe that is configured as a separate element and loads the side of the chain situated opposite thereto. Sliding shoes are generally made of a material having good sliding properties, preferably of plastic, and are either slipped onto or formed by injection on the element concerned. Both the housing and the tensioning piston are normally made of metal. In such tensioning devices, measures for connecting the sliding shoes that are preferably made of plastic, have to be implemented both on the housing and on the tensioning piston. In the aforesaid document, DE 196 51 091 A1, for example, the housing comprises bores into which the material of the sliding shoes penetrates to form an interlocked connection between the housing and the sliding shoe.

OBJECTS OF THE INVENTION

It is an object of the invention to improve a tensioning device of the pre-cited type so that it is simple and economic to manufacture. This and other objects and advantages of the invention will become obvious from the following detailed description.

SUMMARY OF THE INVENTION

The invention achieves the above objects by the fact that the housing and the sliding shoe are made in one piece with each other. A particular advantage of this is that it is no longer necessary to work with two or more materials but a single material is sufficient to make both the housing and the sliding shoe. A further advantage is that no special measures have to be implemented on the housing to assure a reliable connection between the housing and the sliding shoe. Still another advantage is that one work step is totally dispensed with because the attachment of a separate sliding shoe on the housing is no longer required.

According to a particularly favorable feature of the invention, the first sliding shoe and the housing are made of plastic, preferably polyamide. The housing and the first sliding shoe can be injection molded in a common injection mold. Especially for large series such as are required in the automobile sector, the tensioning devices of the invention can be manufactured very economically. It has been determined that the use of polyamide in the present invention offers very great advantages.

For example, if the housing comprises a cylindrical recess for the tensioning piston, the tensioning piston can be perfectly guided on the cylinder wall and the good sliding properties of polyamide permit a low-friction guidance. The material used for making the sliding shoe must be tough and must possess high abrasion resistance and good sliding properties. All these requirements are met by polyamide. Since polyamide possesses properties that meet the requirements made both of the housing and the sliding shoe, it is obvious that this material is most suitable for forming the housing and the sliding shoe together in one piece.

Advantageously, the housing may be reinforced with fibers, especially glass fibers. The glass fibers are inserted into the part of the injection mold which is intended for the housing, while the sliding shoe is preferably not reinforced.

If it is more advantageous for special uses to make the housing and the sliding shoe of different materials or plastics, this can be done without any problem using the two-component injection method. In this method, a first plastic is filled into the part of the injection mold meant for the sliding shoe and the other material is filled into the part of the injection mold meant for the housing. An integrally connected structure is assured.

Two mounting eyes can be provided in the housing through which fixing means, particularly screws can be inserted. Normally, engine blocks or cylinder heads of internal combustion engines comprise threaded bores into which the screws can be screwed. This enables a secure fixing of the housing on the engine block or the cylinder head.

The mounting eyes can be lengthened by an integral formation of sleeve-like extensions on the housing. This is intended to assure that the housing cannot tilt on the shanks of the screws. It can also be advantageous to strengthen the mounting eyes with metal inserts which may be pressed, glued or welded in place or covered with the plastic by injection.

If the housing and the first sliding shoe are made by injection molding or casting, it is no problem to connect the housing and the first sliding shoe rigidly to each other with the help of integrally formed stiffening ribs. The stiffening ribs can be provided in a simple manner in the injection mold.

In another embodiment of the invention, the tensioning piston and the second sliding shoe are also made in one piece with each other. Substantially the same advantages are obtained with this one-piece structure as with the one-piece structure comprising the housing and the first sliding shoe described above. Thus, in a very economic embodiment of the tensioning device of the invention, polyamide is chosen as the material for the tensioning piston and the second sliding shoe as well. Ideally, the tensioning device of the invention is therefore made entirely of one single material.

Similar to the housing, if necessary, the tensioning piston can also be reinforced with fibers, especially glass fibers.

The tensioning piston may comprise a recess for a spring, particularly a coiled compression spring which is supported at one end on the housing and at the other end on the tensioning piston. Besides the advantage of saving space required for the spring, this embodiment has the further advantage that the tensioning piston is optimized for purposes of injection molding because the provision of the recess leads to the formation of an annular cylindrical wall of uniform wall thickness which can be manufactured in a perfect manner. In the case of a solid tensioning piston, irregular cooling can result in an undesired distortion of the piston.

The transition from the tensioning piston to the sliding shoe in the running directions of the chain is preferably a flared enlargement. In this way is not only a desired stiffening obtained but notch effect is also excluded which should be avoided because of the high-frequency vibratory loading.

For the same reasons, it is advantageous to configure the transition from the housing to the first sliding shoe in the running directions of the chain likewise as a flared enlargement.

The invention will now be described more closely with the help of three examples of embodiment illustrated in the five appended figures.

DETAILED DESCRIPTION OF THE DRAWINGS

Figure 1:
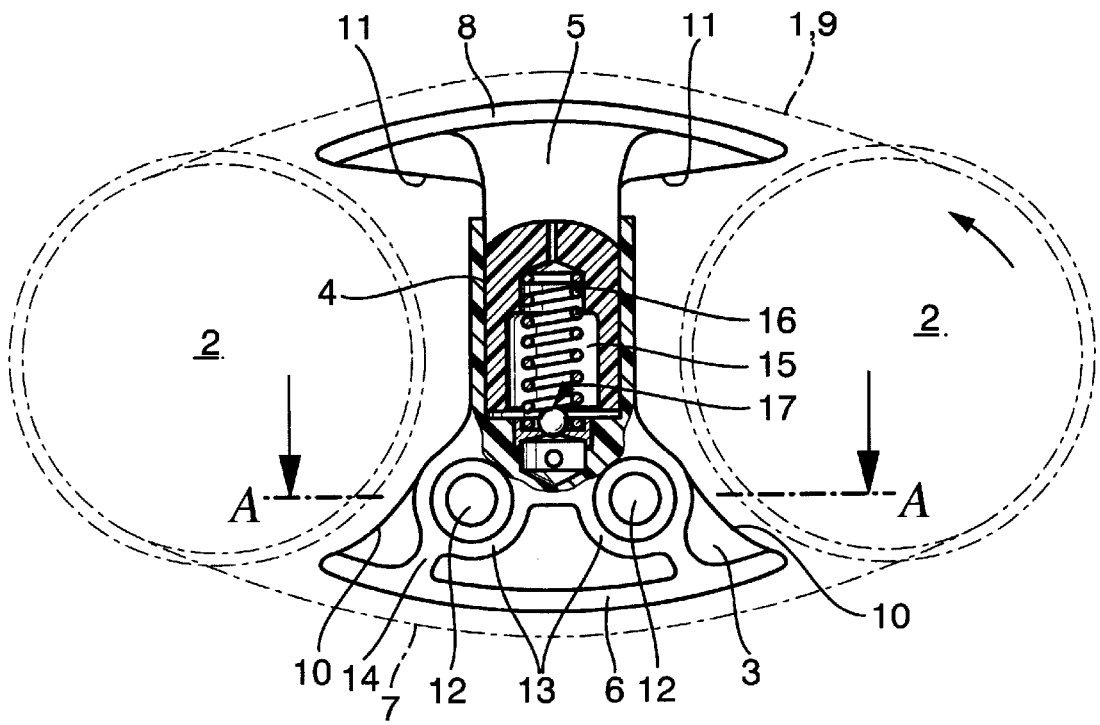
FIG. 1 is a top view of a tensioning device of the invention.

FIG. 1 shows a tensioning device of the invention which is arranged between two parallel camshafts, not shown, of an internal combustion engine. A chain 1 is wrapped round chain pulleys 2 each of which is connected to one of the camshafts. The tensioning device of the invention comprises a housing 3 in whose bore 4 a tensioning piston 5 is arranged for longitudinal displacement. A first sliding shoe 6 is integrally connected to the housing 3 and bears against the slack side 7 of the chain 1. A second sliding shoe 8 that is integrally connected to the tensioning piston 5 bears against the tension side 9 of the chain 1.

The transition from the tensioning piston 5 to the second sliding shoe 8 and from the housing 3 to the first sliding shoe 6 are both configured as flared enlargements 10, 11 to guarantee rigid connections of stable shape. The housing 3 further comprises mounting eyes 12 which are lengthened by sleeve-like extensions 13 formed integrally on the housing in a direction perpendicular to a plane enclosed by the chain.

The device further comprises stiffening ribs 14 that merge integrally into the sleeve-like extensions 13 and the first sliding shoe 6. In this way, the first sliding shoe 6 and the sleeve-like extensions 13 are connected rigidly to the housing 3.

The housing 3, the first sliding shoe 6, the tensioning piston 5 and the second sliding shoe 8 are all made of polyamide, the housing 3 being reinforced with glass fibers, not shown, that are embedded in the polyamide.

The tensioning piston 5 comprises a recess 15 in which a coiled compression spring 16 is arranged that is supported at one end on the housing 3 and at the other end on the tensioning piston 5. The tensioning piston 5, and with it the integrally formed second sliding shoe 8, is biased against the tension side 9 of the chain 1 by the spring force of the coiled compression spring 16. A hydraulic damping device 17, known, per se, assures in a known manner a damping of inward movements of the tensioning piston 5.

Figure 2:
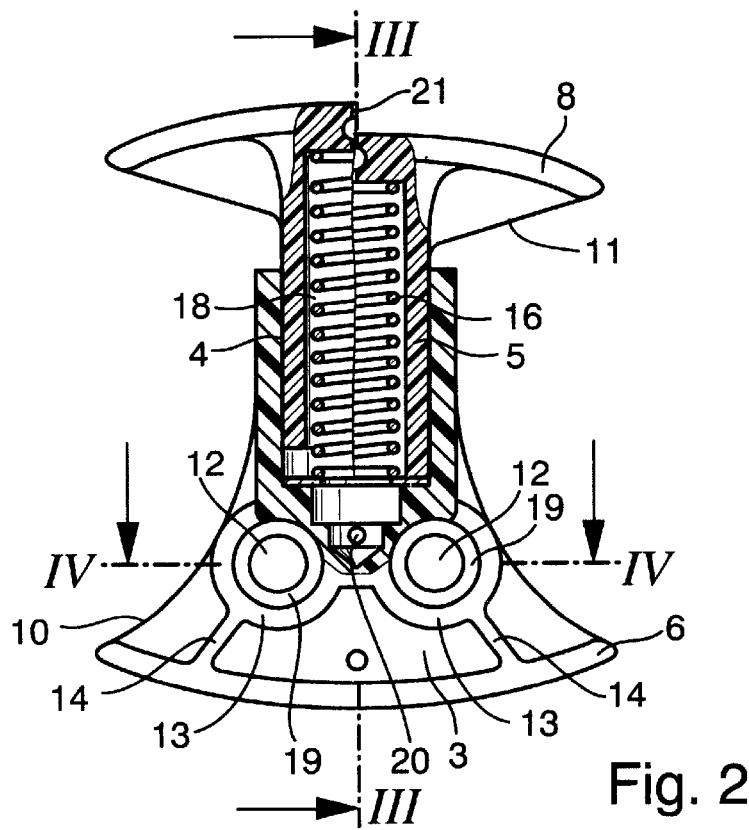
FIG. 2 shows a modified tensioning device of the invention.

FIG. 2 shows a tensioning device of the invention similar to the device of FIG. 1 but without a hydraulic damping element and with a larger recess 18 for the coiled compression spring 16. The tensioning piston 5 is shown both in a retracted and an extended position.

Figure 4:
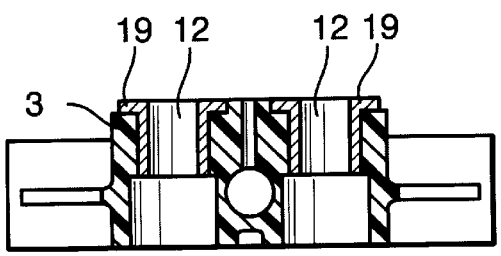
FIG. 4 is a sectional representation along line IV—IV of FIG. 2.

As clearly discernible in FIG. 4, metal inserts 19 are inserted into the mounting eyes 12.

The housing 3 comprises an oil feed bore 20 through which engine oil is conveyed into the bore 4 of the housing 3. This engine oil can flow out through a throttling bore 21 that is provided in the tensioning piston 5 and ends on the surface of the second sliding shoe 8. The out-flowing engine oil serves at the same time to lubricate the chain.

Figure 3:
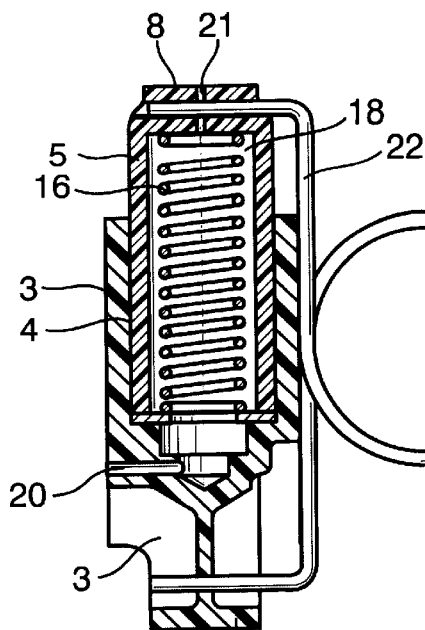
FIG. 3 is a sectional representation along line III—III of FIG. 2.

The oil feed bore 20 and the throttling bore 21 can be clearly seen in FIG. 3. This figure further shows a clip 22 that holds the tensioning piston 5 and the housing 3 together in a pre-determined position. After the assembly of the tensioning device of the invention, the clip 22 is removed, so that the tensioning piston 5 is biased against the chain by the force of the coiled compression spring 16.

FIG. 4 clearly shows the metal inserts 19 that are inserted into the mounting eyes 12 of the housing 3.

Figure 5:
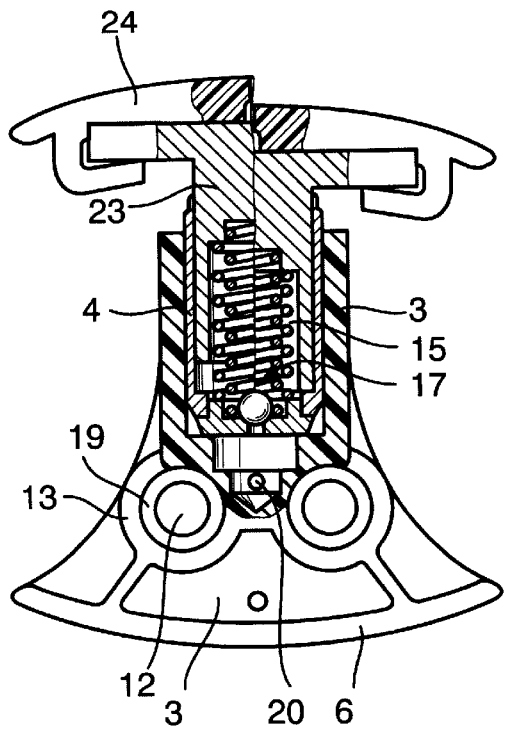
FIG. 5 shows a further tensioning device of the invention.

FIG. 5 shows a further tensioning device of the invention. The essential difference of this device from the device of FIG. 1 is that a sliding shoe 24 made as a separate part is seated on a tensioning piston 23.

What is claimed is:

1. A chain tensioning device comprising a housing made of plastic reinforced with fibers carrying a first sliding shoe made of plastic without fiber reinforcement for contact with a first side of a chain and a tensioning piston made of plastic reinforced with fibers guided on the housing, said tensioning piston comprising a second sliding shoe made of plastic for contact with a second side of the chain, the housing and the first sliding shoe and the tensioning piston and the second sliding shoe being made in one piece with each other.

2. A tensioning device of claim 1 wherein the plastic is polyamide.

3. A tensioning device of claim 1 wherein the fibers are glass fibers.

4. A tensioning device of claim 1 wherein the housing comprises a reception for the tensioning piston.

5. A tensioning device of claim 4 wherein the reception is a bore.

6. A tensioning device of claim 1 wherein the housing comprises two mounting eyes for insertion of a connecting means.

7. A tensioning device of claim 6 wherein the connecting means is configured as screws.

8. A tensioning device of claim 6 wherein the mounting eyes are lengthened by sleeve-like extensions integrally on the housing.

9. A tensioning device of claim 8 wherein metal inserts are inserted into the mounting eyes.

10. A tensioning device of claim 1 wherein the housing and the first sliding shoe are connected rigidly to each other by integrally formed stiffening ribs.

11. A tensioning device of claim 1 wherein the plastic is polyamide.

12. A tensioning device of claim 1 wherein the fibers are glass fibers.

13. A tensioning device of claim 1 wherein the tensioning piston comprises a recess for a spring which is supported at one end on the housing and at another end on the tensioning piston.

14. A tensioning device of claim 13 wherein the spring is a coiled compression spring.

15. A tensioning device of claim 1 wherein a transition from the tensioning piston to the second sliding shoe in running directions of the chain is configured as a flared enlargement.

16. A tensioning device of claim 1 wherein a transition from the housing to the first sliding shoe in running directions of the chain is configured as a flared enlargement.

* * * * *